(12) United States Patent
Wang et al.

(10) Patent No.: US 12,038,499 B1
(45) Date of Patent: Jul. 16, 2024

(54) MULTI-SOURCE ELEVATION DATA FUSION METHOD, APPARATUS, COMPUTER DEVICE, AND MEDIUM

(71) Applicant: SUN YAT-SEN UNIVERSITY, Guangdong (CN)

(72) Inventors: Qingsong Wang, Guangdong (CN); Cuilin Yu, Guangdong (CN); Haifeng Huang, Guangdong (CN); Tao Lai, Guangdong (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 0 days.

(21) Appl. No.: 18/398,309

(22) Filed: Dec. 28, 2023

Related U.S. Application Data

(63) Continuation of application No. PCT/CN2023/107607, filed on Jul. 15, 2023.

(30) Foreign Application Priority Data

Feb. 24, 2023  (CN) .......................... 202310173001.5

(51) Int. Cl.
*G01S 13/88* (2006.01)
*G01S 7/41* (2006.01)
(Continued)

(52) U.S. Cl.
CPC ............ *G01S 13/882* (2013.01); *G01S 7/412* (2013.01); *G01S 13/86* (2013.01); *G06F 18/214* (2023.01); *G06F 18/25* (2023.01)

(58) Field of Classification Search
CPC ...... G06N 3/042; G06N 20/00; G06N 3/0464; G06N 3/045; G01S 13/931; G01S 13/865; G01S 17/931; G01S 13/953; G01S 17/89; G01S 17/006; G01S 13/006; G01S 15/006; G01S 13/882; G01S 7/412; G01S 13/86; G01S 13/867; G01S 7/497; G01S 13/89; G01S 7/417; G06V 20/56; G06V 20/58; G06V 10/82; B60W 2556/35; B60W 2420/408; G06T 2207/20084;
(Continued)

(56) References Cited

U.S. PATENT DOCUMENTS 11,562,556 B1 * 1/2023 Kabzan ............... G06V 10/7747
2018/0367871 A1 * 12/2018 Zeng ..................... G01S 13/931
(Continued)

*Primary Examiner* — Olumide Ajibade Akonai

(57) ABSTRACT

A multi-source elevation data fusion method including: inputting acquired optical elevation data into a trained optical elevation error prediction model to output an optical elevation error value and an optical elevation error weight map; inputting acquired radar elevation data into a trained radar elevation error prediction model to output a radar elevation error value and a radar elevation error weight map; correcting the optical elevation data based on the optical elevation error value to obtain optical elevation data to be fused; correcting the radar elevation data based on the radar elevation error value to obtain radar elevation data to be fused; performing weighted fusion on the optical elevation data to be fused and the radar elevation data to be fused based on the optical elevation error weight map and the radar elevation error weight map to obtain fused elevation data. This method efficiently enhances the accuracy of fused elevation data.

20 Claims, 3 Drawing Sheets

(51) Int. Cl.
 *G01S 13/86* (2006.01)
 *G06F 18/214* (2023.01)
 *G06F 18/25* (2023.01)

(58) Field of Classification Search
 CPC . G06T 2207/20221; G06T 2207/10044; G06F 18/214; G06F 18/25
 See application file for complete search history.

(56) References Cited

U.S. PATENT DOCUMENTS

| | | | |
|---|---|---|---|
| 2020/0111011 A1* | 4/2020 | Viswanathan | G06N 20/10 |
| 2021/0063200 A1* | 3/2021 | Kroepfl | C03C 17/3644 |
| 2023/0109909 A1* | 4/2023 | Meng | G06N 20/00 |
| | | | 342/54 |
| 2023/0176204 A1* | 6/2023 | Yang | G01S 13/89 |
| | | | 342/52 |

\* cited by examiner

MULTI-SOURCE ELEVATION DATA FUSION METHOD, APPARATUS, COMPUTER DEVICE, AND MEDIUM

CROSS REFERENCE TO RELATED APPLICATIONS

The present application is a Continuation Application of PCT Application No. PCT/CN2023/107607 filed on Jul. 15, 2023, which claims the benefit of Chinese Patent Application No. 202310173001.5 filed on Feb. 24, 2023. All the above are hereby incorporated by reference in their entirety.

FIELD OF THE INVENTION

The present application relates to the field of mathematical elevation model technologies, and in particular to a multi-source elevation data fusion method and apparatus, a computer device, and a medium.

BACKGROUND OF THE INVENTION

The abundant optical, laser, and SAR (Synthetic Aperture Radar) satellite data have become crucial data support for the production of geographic spatial reference products, with DEMs (Digital Elevation Model) being a representative example. Both domestic and international researchers have developed a series of methods for the processing of optical, laser, and SAR data, as well as the generation of geographic spatial products. These methods have been widely applied in various fields such as hydrology, geology, meteorology, and military. However, these products inevitably suffer from quality issues such as data gaps, noise, and outliers during collection and production processes, influenced by factors like observation technology and terrain environment. For example, optical imaging with its shorter wavelength faces difficulties in penetrating through clouds and fog. As a result, optical elevation data is sensitive to the influence of noise and outliers. SAR imaging can partially overcome weather effects and operate under all-weather conditions, but its observation mode of side-looking imaging is sensitive to the influence of terrain slope angles, leading to the likelihood of data gaps in areas of terrain undulations with steep slopes. Additionally, SAR also encounters technical issues such as radar shadows and phase unwrapping. The satellite-borne laser can capture a broader range of high-precision altimetric information, but it encounters issues such as high data acquisition costs and discontinuous spatial coverage. Therefore, the fusion of multi-source DEM data, breaking the limitations of a single source, and enhancing the quality of geographic spatial reference products have become a focal point of research for both domestic and international scholars.

Currently, existing fusion methods are mostly based on traditional approaches and often do not adequately consider the differences in acquisition methods, resolution, coverage range, and accuracy among multi-source data. Therefore, the existing technologies encounter the issue of low accuracy in fused multi-source elevation data due to a lack of consideration for differences among elevation data.

SUMMARY OF THE INVENTION

The present application provides a multi-source elevation data fusion method and apparatus, a computer device, and a medium, which can effectively enhance the accuracy of fused elevation data after the fusion of multi-source elevation data.

In a first aspect, an embodiment of the present application provides a multi-source elevation data fusion method. The method is applied to an elevation data fusion device. The method includes:

inputting acquired optical elevation data into a trained optical elevation error prediction model to output an optical elevation error value and an optical elevation error weight map;

inputting acquired radar elevation data into a trained radar elevation error prediction model to output a radar elevation error value and a radar elevation error weight map;

correcting the optical elevation data based on the optical elevation error value to obtain optical elevation data to be fused; correcting the radar elevation data based on the radar elevation error value to obtain radar elevation data to be fused;

performing weighted fusion on the optical elevation data to be fused and the radar elevation data to be fused based on the optical elevation error weight map and the radar elevation error weight map to obtain fused elevation data.

Furthermore, the method further includes:

constructing an optical pre-training model and a radar pre-training model separately based on a deep negative correlation learning network;

preprocessing acquired original optical elevation data and original radar elevation data to respectively obtain an optical elevation training sample and a radar elevation training sample;

inputting the optical elevation training sample into the optical pre-training model for training to obtain the trained optical elevation error prediction model; inputting the radar elevation training sample into the radar pre-training model for training to obtain the trained radar elevation error prediction model;

Furthermore, the process of preprocessing acquired original optical elevation data and original radar elevation data to respectively obtain an optical elevation training sample and a radar elevation training sample includes:

standardizing a coordinate system and an elevation reference for the original optical elevation data and the original radar elevation data to obtain standard optical elevation data and standard radar elevation data; performing an outlier removal operation on the standard optical elevation data based on a smoothing process characterized by two-step mean filtering to obtain the optical elevation training sample; performing an outlier removal operation on the standard radar elevation data based on a smoothing process characterized by two-step mean filtering to obtain the radar elevation training sample.

Furthermore, the process of standardizing a coordinate system and an elevation reference for the original optical elevation data and the original radar elevation data to obtain standard optical elevation data and standard radar elevation data includes:

acquiring an initial elevation coordinate system and an elevation value of a high-precision control point from a laser altimeter system, using the elevation value of the high-precision control point as the elevation reference for the original optical elevation data and the original radar elevation data; converting the coordinate system of the original optical elevation data and the original radar elevation data into the initial elevation coordinate system according to a geographic coordinate system conversion rule;

aligning and correcting a grid spacing of pixels in the original optical elevation data and the grid spacing of pixels in the original radar elevation data to obtain the standard optical elevation data and the standard radar elevation data.

Furthermore, the process of performing an outlier removal operation on the standard optical elevation data based on a smoothing process characterized by two-step mean filtering to obtain the optical elevation training sample includes:

extracting a plurality of spatial feature values from the standard optical elevation data, along with elevation error values corresponding to respective spatial feature values;

detecting whether any of the elevation error values corresponding to respective spatial feature values exceeds a preset deviation value; if an elevation error value exceeds the preset deviation value, removing the spatial feature value corresponding to the elevation error value that exceeds the preset deviation value to obtain a plurality of non-anomalous spatial feature values;

filtering the elevation error values corresponding to respective non-anomalous spatial feature values using a mean filter, and repeating this step until the number of the elevation error values is 1, to obtain a unique elevation error value;

using the unique elevation error value and the plurality of non-anomalous spatial feature values as the optical elevation training sample.

Furthermore, the method further includes:

performing an accuracy assessment on the fused elevation data utilizing a checkpoint method within quantitative evaluation indicators to obtain a plurality of accuracy indicators.

Furthermore, the plurality of accuracy indicators includes: a mean square error, a root-mean-square error, a mean absolute error, and a goodness of fit of the fused elevation data.

In a second aspect, an embodiment of the present application provides a multi-source elevation data fusion apparatus, applied to an elevation data fusion device. The apparatus includes:

a prediction module, configured to input acquired optical elevation data into a trained optical elevation error prediction model to output an optical elevation error value and an optical elevation error weight map, and input acquired radar elevation data into a trained radar elevation error prediction model to output a radar elevation error value and a radar elevation error weight map;

a correction module, configured to correct the optical elevation data based on the optical elevation error value to obtain optical elevation data to be fused; correcting the radar elevation data based on the radar elevation error value to obtain radar elevation data to be fused;

a fusion module, configured to perform weighted fusion on the optical elevation data to be fused and the radar elevation data to be fused based on the optical elevation error weight map and the radar elevation error weight map to obtain fused elevation data.

In a third aspect, an embodiment of the present application provides a computer device, including: a memory, a processor, and a computer program stored in the memory and executable on the processor. When executing the computer program, the processor implements the steps of the multi-source elevation data fusion method as described in any one of the above-mentioned embodiments.

In a fourth aspect, an embodiment of the present application provides a computer-readable storage medium, storing thereon a computer program. When the computer program is executed by a processor, the steps of the multi-source elevation data fusion method described in any one of the above-mentioned embodiments are implemented.

In sum, compared with the prior art, the technical solutions of the embodiments of the present application bring at least the following beneficial effects.

The multi-source elevation data fusion method provided by the present application performs error prediction on two types of elevation data to be fused using two trained elevation error prediction models, respectively, and corrects the two types of elevation data to be fused based on two types of predicted elevation error values, respectively, to get higher accuracy; and then performs weighted fusion on the two types of elevation data to be fused based on two types of elevation error weight maps generated during the error prediction process, thereby compensating for the differences between different elevation data and enhancing the accuracy of fused elevation data.

DETAILED DESCRIPTION OF THE INVENTION

Now with reference to the drawings in the embodiments of the present application, the technical solutions of the embodiments of the present application will be described clearly and comprehensively. The described embodiments are only a part of the embodiments of the present application, not all the embodiments. Based on the embodiments of the present application, all other embodiments obtained by those skilled in the art without inventive effort are within the protection scope of the present application.

Figure 1:
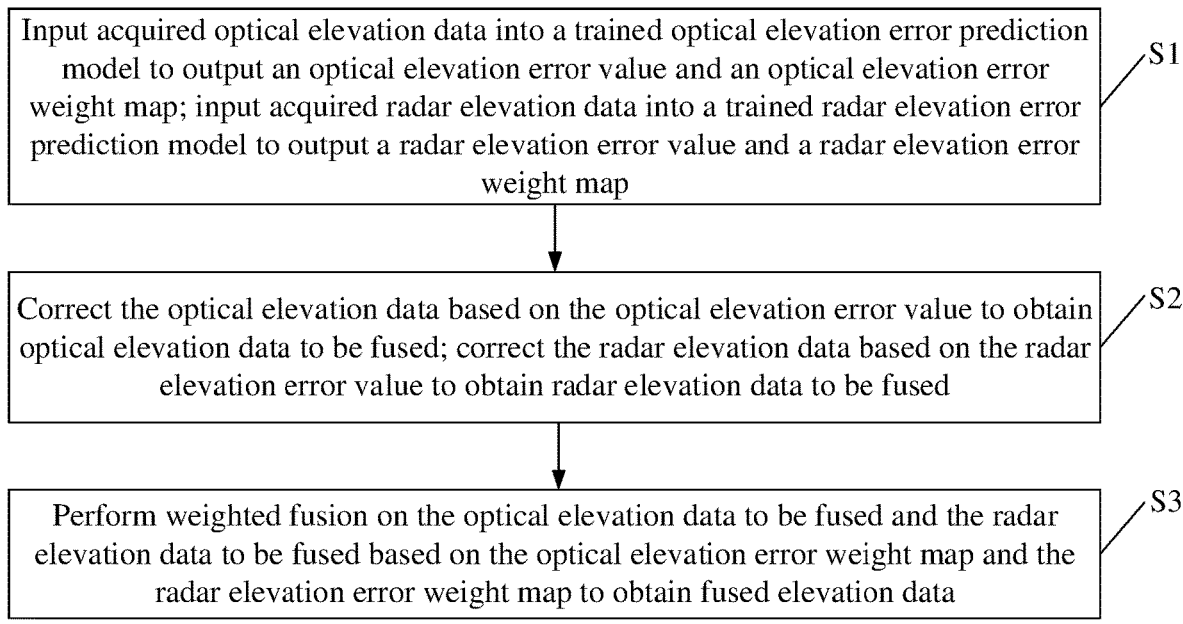
FIG. 1 is a flowchart of multi-source elevation data fusion provided by an exemplary embodiment of the present application.

Please refer to FIG. 1. An embodiment of the present application provides a multi-source elevation data fusion method. The method is applied to an elevation data fusion device. As an example, taking an elevation data fusion device as the execution entity, the method includes:

Step S1, inputting acquired optical elevation data into a trained optical elevation error prediction model to output an optical elevation error value and an optical elevation error weight map; inputting acquired radar elevation data into a trained radar elevation error prediction model to output a radar elevation error value and a radar elevation error weight map.

In this step, the optical elevation data refers to DEM data acquired by optical means from a spaceborne thermal emission and reflection radiometer, and the radar elevation data refers to radar image DEM data.

Step S2, correcting the optical elevation data based on the optical elevation error value to obtain optical elevation data to be fused; correcting the radar elevation data based on the radar elevation error value to obtain radar elevation data to be fused.

To be more specific, this step involves adding the optical elevation error value to the optical elevation data to obtain the optical elevation data to be fused, and adding the radar elevation error value to the radar elevation data to obtain the radar elevation data to be fused.

Step S3, performing weighted fusion on the optical elevation data to be fused and the radar elevation data to be fused based on the optical elevation error weight map and the radar elevation error weight map to obtain fused elevation data.

In this step, the weighted fusion can process each grid independently. Two types of elevation error weight maps are used to quantify the impact of the two types of input elevation data to be fused at each grid or surface position. It's a simple DEM fusion method with a low calculation cost.

To be more specific, assuming $W_{optical}^n$ is the optical elevation error weight map, $W_{SAR}^n$ is the radar elevation error weight map, the performance of a weight map depends on the distribution of weights of the elevation error values within pixels of the elevation data DEM to be fused. Generally, a non-empty data set may be represented as $\{x_1, x_2, \ldots, x_n\}$, and the weight map is composed of non-negative values, so the weight values in the weight map may be represented as $\{w_1, w_2, \ldots, w_n\}$. Thus, the calculation formula for weighted fusion may be derived as follows.

$$\bar{x} = \frac{\sum_{i=1}^{n} w_i x_i}{\sum_{i=1}^{n} w_i} = \frac{w_1 x_1 + w_2 x_2 + \ldots + w_n x_n}{w_1 + w_2 + \ldots + w_n}$$

where, $\tilde{x}$ is the fused data, $x_i$ is the data to be fused. According to this formula, the point with higher weight has a bigger impact on the weighted mean. This formula may be simplified to standard weights, and the sum of weights is as follows.

$$\sum_{i=1}^{n} w_i = 1$$

The multi-source elevation data fusion method provided by the above embodiment performs error prediction on two types of elevation data to be fused using two trained elevation error prediction models, respectively, and corrects the two types of elevation data to be fused based on two types of predicted elevation error values, respectively, to get higher accuracy; and then performs weighted fusion on the two types of elevation data to be fused based on two types of elevation error weight maps generated during the error prediction process, thereby compensating for the differences between different elevation data, enhancing the accuracy of fused elevation data.

Figure 2:
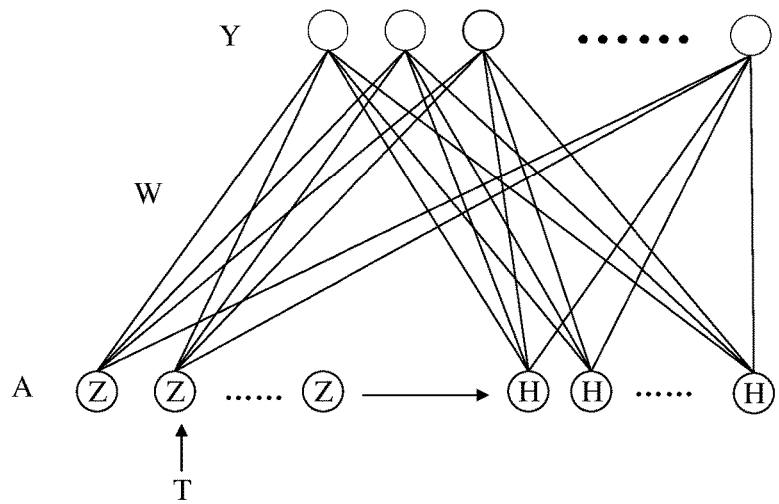
FIG. 2 is a structural diagram of a broad learning network provided by an exemplary embodiment of the present application.
Figure 3:
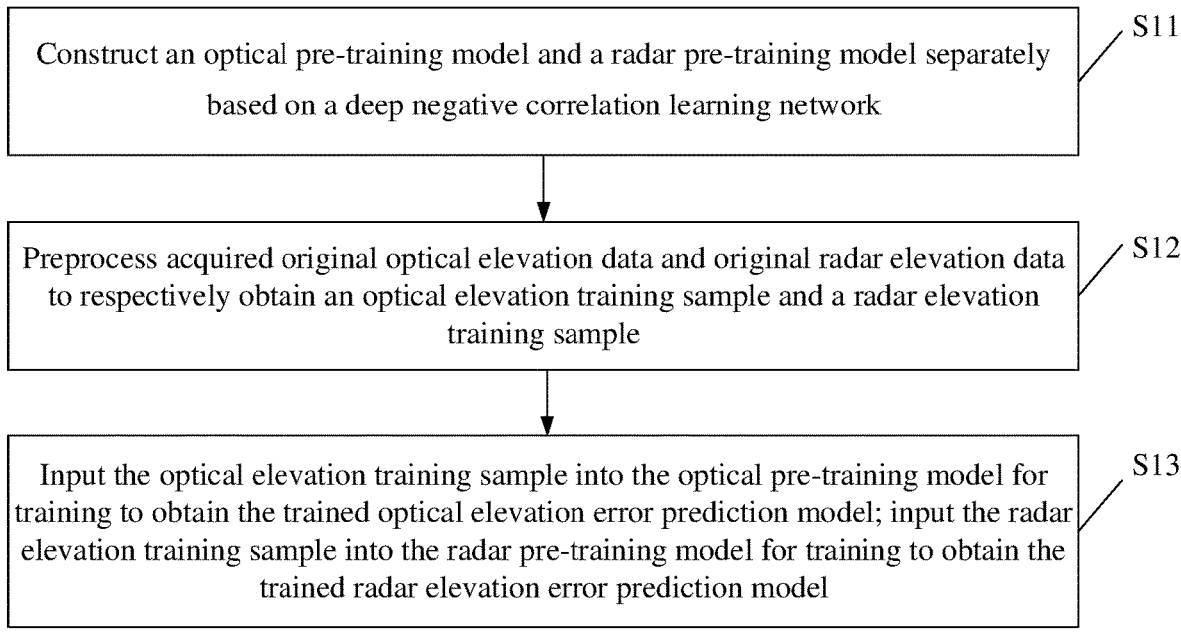
FIG. 3 is a flowchart of training steps of an elevation error prediction module provided by an exemplary embodiment of the present application.

Please refer to FIG. 2 and FIG. 3. In some embodiments, the method may further specifically includes:

Step S11, constructing an optical pre-training model and a radar pre-training model separately based on a deep negative correlation learning network.

To be more specific, both the optical pre-training model and the radar pre-training model are constructed by combining the deep negative correlation learning network with a broad learning network, so both of them are elevation prediction models with high robustness and strong generalization capability.

Step S12, preprocessing acquired original optical elevation data and original radar elevation data to respectively obtain an optical elevation training sample and a radar elevation training sample.

Step S13, inputting the optical elevation training sample into the optical pre-training model for training to obtain the trained optical elevation error prediction model; inputting the radar elevation training sample into the radar pre-training model for training to obtain the trained radar elevation error prediction model.

To be more specific, the specific algorithmic principle of the pre-training model constructed based on the deep negative correlation learning network is as follows.

Assuming there are N training samples (in this application, they are optical elevation training samples or radar elevation training samples), $X=\{x_1, x_2, \ldots, x_n\}$, the sample is M-dimensional, where $X \in \chi \subseteq \mathbb{R}^M$. The objective of this pre-training model is to predict the elevation error value. The predicted elevation error value can be expressed as $Y=\{y_1, y_2, \ldots, y_n\}$, where $Y \in \gamma \subseteq \mathbb{R}^M$. x is used to represent a general data sample, denoted as $x_\xi$, where $\xi$ represents the digits occupied by the index when necessary. Therefore, the objective of this algorithm is to learn a mapping function $G: X \to Y$.

The issue of deep negative correlation learning involves using a sample set X to learn a mapping function G, where θ represents a parameter, to approximate their real elevation error values as accurately as possible. The entire learning process may be expressed as follows.

$$L(G) = \int (G(X,\theta)-Y)^2 p(X,Y) d(X,Y)$$

In practical situations, the data distribution p(X, Y) is unknown, therefore, the formula L(G) may be approximated as follows.

$$L(G) = \frac{1}{N} \sum_{I=1}^{N} (G(x_i, \theta) - y_i)^2$$

In the description below, the input vector and the parameter vector are omitted, and G is used to represent the mapping function G(X, θ).

In the training and learning process, a single model may not always be optimal. Thus, by taking the average individual response $G_K$ into account, an ensemble output $\tilde{G}$ can be considered. The ensemble output $\tilde{G}$ may be expressed as follows.

$$\tilde{G} = \frac{1}{K} \sum_{k=1}^{K} G_k$$

Regard the mapping function G as a set of $G_k$ defined in $\tilde{G}$. Each $G_k$ may be expressed as follows.

$$G_K(x_i)=G_k{}^Q(G_k{}^{Q-1} \ldots (G_k{}^1)(x_i)))$$

$$k=1,2,\ldots,K, i=1,2,\ldots N$$

where k, i, and Q represent respectively an index of single model, an index of training sample, and a depth of deep negative correlation learning network. To be more specific, each $G_k$ of the mapping function G is composed of a feature extractor $G_k{}^g$, q=1, 2, ..., Q−1 and a regressor $G_k{}^Q$ cascaded together.

That is to say, the error prediction of elevation data is obtained through the mapping function G of the deep negative correlation learning network in the pre-training model. The mapping function G is composed of a plurality of $G_k$, where each $G_k$'s feature extractor $G_k{}^q$ is implemented with a broad learning network. Please refer to FIG. 2. The architecture of the broad learning network is designed as follows.

Assume the input feature vector to this broad learning network is $\{T\}_n{}^j \in R$. For these n feature vectors, p enhanced nodes can be generated. The i-th feature vector generates the i-th feature node through projection.

The i-th feature node $Z_i$ can be expressed as follows.

$$Z_i = \varphi(TW_{ei} + \beta_{ei})$$

where i=1, 2, ..., n. $W_{ei}$ and $\beta_{ei}$ represent a random matrix and a bias, respectively. All the feature nodes may be expressed as $Z^n = [Z_1, \ldots, Z_n]$. $\varphi(\cdot)$ is an optional non-linear activation function.

Similarly, the m-th enhanced node may be expressed as follows.

$$H_m = \xi(Z^n W_{hm} + \beta_{hm})$$

where m=1, 2, ..., p. $W_{hm}$ and $\beta_{hm}$ represent a random matrix and a bias, respectively. All the enhanced nodes may be expressed as $H^m = [H_1, \ldots, H_m]$. $\xi(\cdot)$ is an optional non-linear activation function.

A combined matrix obtained by connecting the feature nodes with the enhanced nodes serves as the actual input of this broad learning network. Assuming the output matrix is $Y \in R$, and Y represents the predicted elevation error values for the training samples, the output of this network may be determined by the following equation.

$$Y = [Z_1, \ldots, Z_n | \xi(Z^n W_{h1} + \beta_{h1}), \ldots, \xi(Z^n W_{hm} + \beta_{hm})]W^m$$
$$= [Z_1, \ldots, Z_n | H_1, \ldots, H_m] W^m$$
$$= [Z^n | H^m] W^m$$

Therefore, it can be abbreviated as $Y = [Z^n | H^m] W^m$. Based on the formula $W^m = (\lambda I + AA^T)^{-1} A^T Y$ and the pseudo-inverse ridge regression algorithm $A^+ = \lim(\lambda I + AA^T)^{-1} A^T$, where $A^+ = [Z^n | H^m]^+$, through the above derivation, it can be concluded as follows.

$$W^m = [Z^n | H^m]^+ Y$$

$W^m$ represents connection weights, and the elevation error weight map is composed of the connection weights.

In FIG. 2, A represents the combined matrix that is actually inputted into the neural network, Z represents the feature node, H represents the enhanced node, and the output is Y. During the training phase, Y represents the labels of the training samples, i.e. the predicted elevation error values of the training samples. W represents a connection weight matrix.

The optical elevation error weight map and the radar elevation error weight map may be obtained by using the corresponding pre-training models during training to generate the elevation error weight maps. Therefore, the final weighted fusion calculation may be expressed as follows.

$$X_{fusion} = W_{optical}{}^n \odot X_{optical} + W_{SAR}{}^n \odot X_{SAR}$$

where $X_{fusion}$ represents the fused elevation data, $X_{optical}$ represents the optical elevation data to be fused, and $X_{SAR}$ represents the radar elevation data to be fused.

For the calculation of the weight values $\{w_1, w_2, \ldots, w_n\}$ in the weight map, two strategies can be employed.

The first one is to calculate the weights as the inverse proportion i of the squared elevation errors e:

$$w_i = \frac{1}{e_i^2}$$

The second one is to calculate the weights $e_{in}$ from the normalized residuals:

$$w_i = 1 - e_{in}$$

Because both the deep negative correlation learning network and the broad learning network are neural networks in the prior art, the specific algorithms, structures, and parameters are well-known to those skilled in the art based on existing technologies. Therefore, this application will not reiterate them here.

It should be noted that both the optical pre-training model and the radar pre-training model are trained according to the above steps. The processing, calculation, and training of the input training samples are the same for the two pre-training models.

The above embodiment trains the neural network to predict the elevation error values of elevation data, enabling the present application to more accurately calculate the optical elevation error values or the radar elevation error values when applying the trained optical elevation error prediction model or radar elevation error prediction model; the optical elevation data to be fused, corrected based on the optical elevation error values, and the radar elevation data to be fused, corrected based on the radar elevation error values, are also more accurate, further enhancing the accuracy of the fused elevation data.

Figure 4:
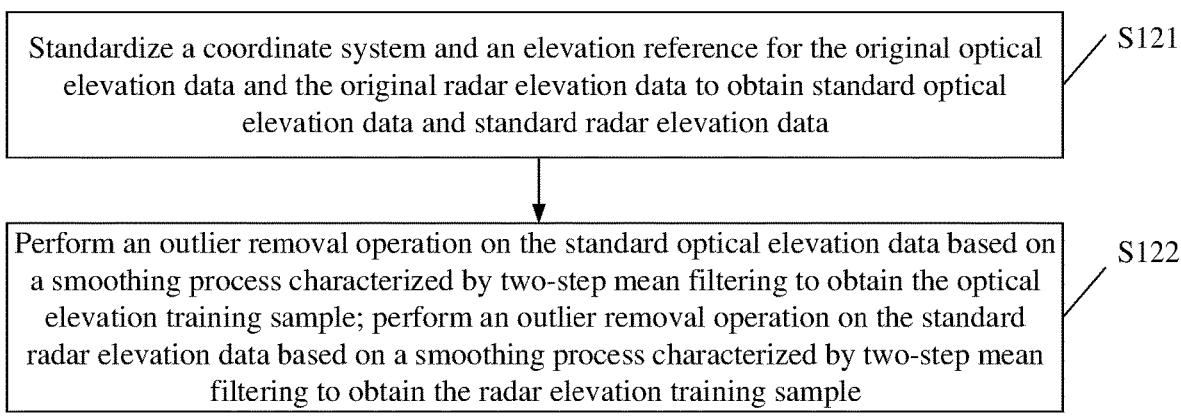
FIG. 4 is a flowchart of preprocessing steps provided by an exemplary embodiment of the present application.

Please refer to FIG. 4. In some embodiments, the process of preprocessing acquired original optical elevation data and original radar elevation data to respectively obtain an optical elevation training sample and a radar elevation training sample may specifically include the following steps:

Step S121, standardizing a coordinate system and an elevation reference for the original optical elevation data and the original radar elevation data to obtain standard optical elevation data and standard radar elevation data.

Step S122, performing an outlier removal operation on the standard optical elevation data based on a smoothing process characterized by two-step mean filtering to obtain the optical elevation training sample; performing an outlier removal operation on the standard radar elevation data based on a smoothing process characterized by two-step mean filtering to obtain the radar elevation training sample.

The above embodiment, through preprocessing of the original elevation data, standardizes the coordinate system and the elevation reference, eliminating the systematic deviation introduced by the elevation system itself in the elevation data. The removal of outliers reduces the impact of noise in the elevation data, avoiding the influence of high-frequency noise pollution on model training and making the predicted elevation error values more accurate during the training process.

In some embodiments, the process of standardizing a coordinate system and an elevation reference for the original optical elevation data and the original radar elevation data to obtain standard optical elevation data and standard radar elevation data may specifically includes:

acquiring an initial elevation coordinate system and an elevation value of a high-precision control point from a laser altimeter system, using the elevation value of the high-precision control point as the elevation reference for the original optical elevation data and the original radar elevation data; converting the coordinate system of the original optical elevation data and the original radar elevation data into the initial elevation coordinate system according to a geographic coordinate system conversion rule.

In this step, besides employing a geographic coordinate system conversion rule, GIS software (e.g., ArcGIS) can be utilized for direct conversion, so as to achieve the standardization of coordinate systems of various elevation data.

Then, a grid spacing of pixels in the original optical elevation data and a grid spacing of pixels in the original radar elevation data are aligned and corrected to obtain the standard optical elevation data and the standard radar elevation data.

Since existing fusion methods in the prior art have limited incorporation of high-precision vector data, this, to a certain extent, constrains the quality of the fused data. Therefore, the above-mentioned embodiments use the elevation value of the high-precision control point obtained by the laser altimeter system as the elevation reference, achieving refinement of the two types of original elevation data, ensuring that the elevation error prediction model trained with the refined elevation data provides more detailed and accurate predictions of elevation error values. The alignment and correction of the grid spacing in both data compensate for differences caused by rotation and translation in elevation data. This further enhances the resolution and accuracy of the fused elevation data after correction.

Figure 5:
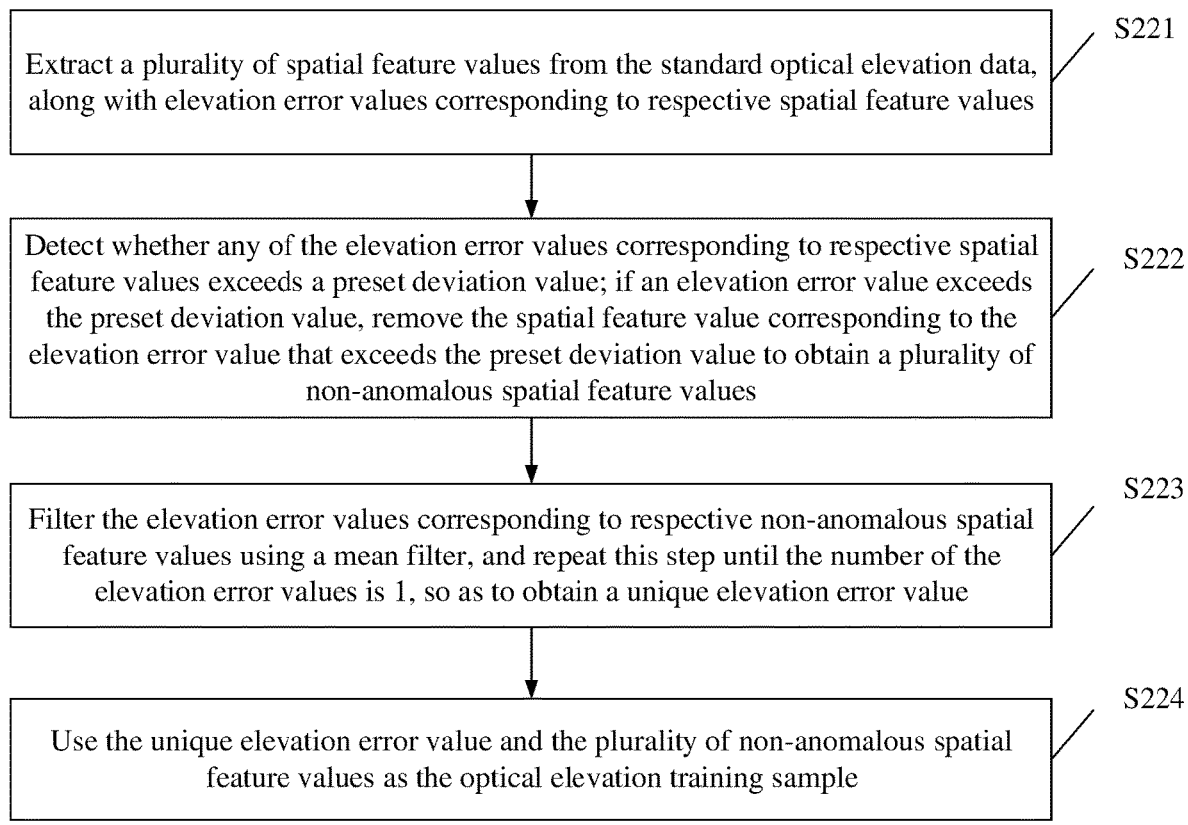
FIG. 5 is a flowchart of acquiring steps of an optical elevation training sample provided by an exemplary embodiment of the present application.

Please refer to FIG. 5. In some embodiments, the process of performing an outlier removal operation on the standard optical elevation data based on a smoothing process characterized by two-step mean filtering to obtain the optical elevation training sample may specifically include:

Step S221, extracting a plurality of spatial feature values from the standard optical elevation data, along with elevation error values corresponding to respective spatial feature values.

Step S222, detecting whether any of the elevation error values corresponding to respective spatial feature values exceeds a preset deviation value; if an elevation error value exceeds the preset deviation value, removing the spatial feature value corresponding to the elevation error value that exceeds the preset deviation value to obtain a plurality of non-anomalous spatial feature values.

To be more specific, the spatial feature value $f_i^j$ and its corresponding elevation error value $e_i$, may be expressed as follows.

$$\begin{bmatrix} f_1^1 & f_1^2 & \cdots & f_1^n \\ f_2^1 & f_2^2 & \cdots & f_2^n \\ \cdots & \cdots & \cdots & \cdots \\ f_m^1 & f_m^2 & \cdots & f_m^n \end{bmatrix} \Leftrightarrow \begin{bmatrix} e_1 \\ e_2 \\ \cdots \\ e_m \end{bmatrix}$$

where $f_i^j$ is the value of the feature $j \in \{1, 2, \ldots, n\}$, $e_i$ is the corresponding elevation error value. When an elevation error value $e_\xi$, $\xi=1, 2, \ldots, l$, exceeds 3×NMAD (the preset deviation value), it is detected as an outlier, and its corresponding spatial feature value $[f_\xi^1, f_\xi^2, \ldots, f_\xi^n]$ is eliminated from the standard optical elevation data. In addition to the classical Root Mean Square Error (RMSE), the Normalized Median Absolute Deviation (NMAD) is a robust accuracy measure for the mitigation of outliers affecting the DEM elevation data. The aforementioned relation between the spatial feature value $f_i^j$ and its corresponding elevation error value $e_i$ may be rewritten in the form of feature vectors that include the values of each feature type for all pixels in the DEM elevation data.

$$[F^1, F^2, \ldots, F^n] \Leftrightarrow E$$

$$F^j = [f_1^j, f_2^j, \ldots, f_m^j]^T$$

Next, a mean filter is applied bit-wise to generate a smoother elevation error value. The output after filtering with the mean filter is specifically as follows. Each feature vector $F^j$ corresponds to a new smoothed elevation error map $E_{avg}^j = [e_{1avg}^j, e_{2avg}^j, \ldots, e_{mavg}^j]^T$. Consequently, for each pixel, n elevation error values are at last obtained.

The next step is to smooth again the achievements of the former step and finally create a unique elevation error value.

Step S223, filtering the elevation error values corresponding to respective non-anomalous spatial feature values using a mean filter, and repeating this step until the number of the elevation error values is 1, so as to obtain a unique elevation error value.

Step S224, using the unique elevation error value and the plurality of non-anomalous spatial feature values as the optical elevation training sample.

While the above embodiment provides an example of filtering out outliers using standard optical elevation data, the same procedure applies when filtering out outliers in standard radar elevation data, with the only difference being the replacement of the data object in the steps.

The above embodiment filters out outliers in the standard optical elevation data, ensuring that the optical pre-training model is not influenced by high-frequency noise during training. This leads to a more accurate optical elevation error values calculated by the final trained optical elevation error prediction model, further enhancing the accuracy of the fused elevation data.

In some embodiments, the method may further specifically includes:

performing an accuracy assessment on the fused elevation data utilizing a checkpoint method within quantitative evaluation indicators to obtain a plurality of accuracy indicators.

In this step, the accuracy assessment of the fused elevation data mainly involves the accuracy assessment of the trained optical elevation error prediction model or the trained radar elevation error prediction model. By calculating the data throughout the process from the start of the training to the end of the training for both error prediction models, the predictive capacity of the two models are assessed. Thus, the accuracy of the fused elevation data is determined.

In some embodiments, the plurality of accuracy indicators may specifically includes: a mean square error, a root-mean-square error, a mean absolute error, and a goodness of fit of the fused elevation data. It may also include a mean error.

Among them, the mean error is sensitive to abnormal elevations, and the mean absolute error better reflects the actual situation of the predicted elevation error values. If the predicted elevation error values do not contain systematic errors, the mean error is approximate to the standard deviation. The standard deviation reflects the dispersion degree of the elevation differences between a test set of a study site and the DEM. The goodness of fit, namely the $R^2_{score}$, normalizes the fused elevation data, making it easier to discern differences between models. The score ranges from 0 to 1.

Assuming n represents the number of training samples, $y_i$ represents the unique elevation error value of the i-th sample, and $\hat{y}_i$ represents the predicted elevation error value of the i-th sample. In mathematical statistics, the mean squared error refers to the expected value of the squared difference between the estimated parameter value and the true parameter value, denoted as MSE. MSE is a convenient method for measuring "average error", and MSE can assess the variability of data. The smaller the MSE value, the better the accuracy of the elevation error values predicted by the error prediction model. The formula is as follows.

$$MSE = \frac{1}{n}\sum_{i=1}^{n}(y_i - \hat{y}_i)^2, \in [0, +\infty)$$

Root Mean Square Error (RMSE) is a typical indicator for regression models, used to indicate how much error the error prediction model is likely to produce in predictions. The smaller the RMSE, the better the elevation error values predicted by the error prediction model.

$$RMSE = \sqrt{\frac{1}{n}\sum_{i=1}^{n}(y_i - \hat{y}_i)^2}, \in [0, +\infty)$$

Mean Absolute Error (MAE) is used to measure the average absolute error between the predicted elevation error values and the true unique elevation error value. The smaller the MAE, the better the pre-training model, and it is defined as follows.

$$MAE = \frac{1}{n}\sum_{i=1}^{n}|y_i - \hat{y}_i|, \in [0, +\infty)$$

Goodness of Fit refers to the degree of fit of the regression line to the observed values. The statistical magnitude that measures the goodness of fit is R-square (also known as coefficient of determination) $R^2$. $R^2$ measures the overall goodness of fit of the regression equation, expressing the overall relationship between the dependent variables and all independent variables. $R^2$ is the ratio of the regression sum of squares to the total sum of squares, representing the percentage of variability of the dependent variables that can be explained by the regression equation. The formula of $R^2$ may be expressed as follows.

$$R^2 = 1 - \frac{\sum_{i=1}^{n}(y_i - \hat{y}_i)^2}{\sum_{i=1}^{n}(y_i - \bar{y})^2}, \in [0, 1]$$

where $\bar{y}$ represents the average value of the true unique elevation error values corresponding to a plurality of training samples.

The accuracy assessment methods provided in the above embodiment assess the predictive capability of the prediction model, i.e. the accuracy of the predicted elevation error values by calculating the training data during the training phase of the two trained error prediction models. From this we know that the higher the accuracy of the predicted elevation error values, the higher the accuracy of the corrected optical elevation data to be fused or the radar elevation data to be fused, thereby ensuring a higher accuracy of the fused elevation data.

Figure 6:
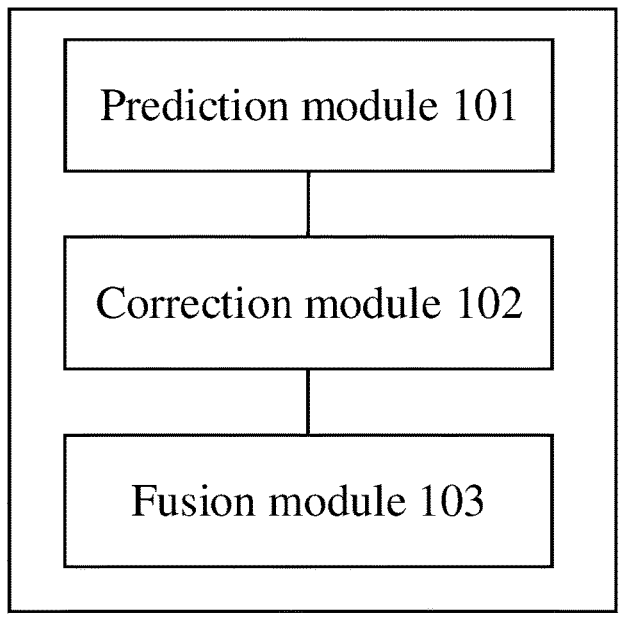
FIG. 6 is a structural diagram of a multi-source elevation data fusion apparatus provided by an exemplary embodiment of the present application.

Please refer to FIG. 6. Another embodiment of the present application provides a multi-source elevation data fusion apparatus, applied to an elevation data fusion device. The apparatus may specifically include:

a prediction module 101, configured to input acquired optical elevation data into a trained optical elevation error prediction model to output an optical elevation error value and an optical elevation error weight map, and input acquired radar elevation data into a trained radar elevation error prediction model to output a radar elevation error value and a radar elevation error weight map;

a correction module 102, configured to correct the optical elevation data based on the optical elevation error value to obtain optical elevation data to be fused; correct the radar elevation data based on the radar elevation error value to obtain radar elevation data to be fused;

a fusion module 103, configured to perform weighted fusion on the optical elevation data to be fused and the radar elevation data to be fused based on the optical elevation error weight map and the radar elevation error weight map to obtain fused elevation data.

The multi-source elevation data fusion apparatus provided by the above embodiment performs error prediction on two types of elevation data to be fused using two trained elevation error prediction models, respectively, and corrects the two types of elevation data to be fused based on two types of predicted elevation error values, respectively, to get higher accuracy; and then performs weighted fusion on the two types of elevation data to be fused based on two types of elevation error weight maps generated during the error prediction process, thereby compensating for the differences between different elevation data and enhancing the accuracy of fused elevation data.

The specific limitations regarding the multi-source elevation data fusion apparatus provided by the present embodiment can be referred to the embodiments of a multi-source elevation data fusion method described above and will not be reiterated here. The various modules in the above-mentioned multi-source elevation data fusion apparatus can be implemented entirely or partially through software, hardware, or their combination. The various modules mentioned above can be embedded in or operate independently within the processor of a computer device in hardware form. Alternatively, they can be stored in the memory of the computer device in software form facilitating the processor to invoke and execute the operations corresponding to the various modules mentioned above.

An embodiment of the present application provides a computer device. The computer device may include a processor, a memory, a network interface, and a database connected via a system bus. Wherein, the processor of the computer device is configured to provide computing and control capabilities. The memory of the computer device includes a non-volatile storage medium and an internal memory. The non-volatile storage medium stores an operating system, a computer program, and a database. The internal memory provides an environment for operation of the operating system and computer program stored in the non-volatile storage medium. The network interface of the computer device is configured to communicate with an external terminal through a network connection. When executed by the processor, the computer program causes the processor to perform the steps of a multi-source elevation data fusion method of any one of the above-mentioned embodiments.

The working processes, working details, and technical effects of the computer device provided by the present embodiment can be referred to the embodiments of a multi-source elevation data fusion method described above and will not be reiterated here.

An embodiment of the present application provides a computer-readable storage medium, storing thereon a computer program. When the computer program is executed by a processor, the steps of the multi-source elevation data fusion method described in any one of the above-mentioned embodiments are implemented. Wherein, the computer-readable storage medium refers to a carrier for storing data, including but not limited to a floppy disk, an optical disc, a hard disk, a flash memory, a USB flash drive, and/or a memory stick, and the computer may be a general-purpose computer, a specialized computer, a computer network, or other programmable apparatus.

The working processes, working details, and technical effects of the computer-readable storage medium provided by the present embodiment can be referred to the embodiments of a multi-source elevation data fusion method described above and will not be reiterated here.

Those skilled in the art can understand that all or part of the processes of the methods in the above embodiments can be implemented by instructing relevant hardware through a computer program. The computer program can be stored in a non-volatile computer-readable storage medium. When executed, the computer program may include the processes in the above-mentioned embodiments. Wherein, any reference to the memory, storage, database, or other medium used in the various embodiments provided by the present application may include a non-volatile and/or volatile memory. The non-volatile memory may include a read-only memory (ROM), a programmable ROM (PROM), an erasable programmable ROM (EPROM), an electrically erasable programmable ROM (EEPROM), or a flash memory. The volatile memory may include a random-access memory (RAM) or an external high-speed cache memory. As an illustration and not a limitation, a RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), a rambus dynamic RAM (RDRAM), and so on.

The various technical features of the above embodiments can be combined in any manner. To keep the description concise, not all possible combinations of technical features in the embodiments are explicitly described. However, as long as these combinations of technical features do not contradict each other, they should be considered within the scope of the present disclosure.

The described embodiments are only a few possible implementations of the present application. While the description is specific and detailed, it should not be construed as limiting the scope of the present invention. It should be noted that those skilled in the art can make various modifications and improvements without departing from the concept of the present application, and these modifications and improvements are included within the protection scope of the present application. Therefore, the protection scope of the present patent application should be determined according to the appended claims.

The invention claimed is:

1. A multi-source elevation data fusion method, wherein the method comprises:
    inputting acquired optical elevation data into a trained optical elevation error prediction model to output an optical elevation error value and an optical elevation error weight map; inputting acquired radar elevation data into a trained radar elevation error prediction model to output a radar elevation error value and a radar elevation error weight map;
    correcting the optical elevation data based on the optical elevation error value to obtain optical elevation data to be fused; correcting the radar elevation data based on the radar elevation error value to obtain radar elevation data to be fused;
    performing weighted fusion on the optical elevation data to be fused and the radar elevation data to be fused based on the optical elevation error weight map and the radar elevation error weight map to obtain fused elevation data.

2. The method according to claim 1, wherein the method further comprises:
    constructing an optical pre-training model and a radar pre-training model separately based on a deep negative correlation learning network;
    preprocessing acquired original optical elevation data and original radar elevation data to respectively obtain an optical elevation training sample and a radar elevation training sample;
    inputting the optical elevation training sample into the optical pre-training model for training to obtain the trained optical elevation error prediction model; inputting the radar elevation training sample into the radar pre-training model for training to obtain the trained radar elevation error prediction model.

3. The method according to claim 2, wherein the process of preprocessing acquired original optical elevation data and original radar elevation data to respectively obtain an optical elevation training sample and a radar elevation training sample comprises:
    standardizing a coordinate system and an elevation reference for the original optical elevation data and the original radar elevation data to obtain standard optical elevation data and standard radar elevation data;
    performing an outlier removal operation on the standard optical elevation data based on a smoothing process characterized by two-step mean filtering to obtain the optical elevation training sample; performing an outlier removal operation on the standard radar elevation data based on a smoothing process characterized by two-step mean filtering to obtain the radar elevation training sample.

4. The method according to claim 3, wherein the process of standardizing a coordinate system and an elevation reference for the original optical elevation data and the original radar elevation data to obtain standard optical elevation data and standard radar elevation data comprises:
acquiring an initial elevation coordinate system and an elevation value of a high-precision control point from a laser altimeter system, using the elevation value of the high-precision control point as the elevation reference for the original optical elevation data and the original radar elevation data;
converting the coordinate system of the original optical elevation data and the original radar elevation data into the initial elevation coordinate system according to a geographic coordinate system conversion rule;
aligning and correcting a grid spacing of pixels in the original optical elevation data and the grid spacing of pixels in the original radar elevation data to obtain the standard optical elevation data and the standard radar elevation data.

5. The method according to claim 3, wherein the process of performing an outlier removal operation on the standard optical elevation data based on a smoothing process characterized by two-step mean filtering to obtain the optical elevation training sample comprises:
extracting a plurality of spatial feature values from the standard optical elevation data, along with elevation error values corresponding to respective spatial feature values;
detecting whether any of the elevation error values corresponding to respective spatial feature values exceeds a preset deviation value; if an elevation error value exceeds the preset deviation value, removing the spatial feature value corresponding to the elevation error value that exceeds the preset deviation value to obtain a plurality of non-anomalous spatial feature values;
filtering the elevation error values corresponding to respective non-anomalous spatial feature values using a mean filter, and repeating this step until the number of the elevation error values is 1, so as to obtain a unique elevation error value;
using the unique elevation error value and the plurality of non-anomalous spatial feature values as the optical elevation training sample.

6. The method according to claim 1, wherein the method further comprises:
performing an accuracy assessment on the fused elevation data utilizing a checkpoint method within quantitative evaluation indicators to obtain a plurality of accuracy indicators.

7. The method according to claim 2, wherein the method further comprises:
performing an accuracy assessment on the fused elevation data utilizing a checkpoint method within quantitative evaluation indicators to obtain a plurality of accuracy indicators.

8. The method according to claim 3, wherein the method further comprises:
performing an accuracy assessment on the fused elevation data utilizing a checkpoint method within quantitative evaluation indicators to obtain a plurality of accuracy indicators.

9. The method according to claim 4, wherein the method further comprises:
performing an accuracy assessment on the fused elevation data utilizing a checkpoint method within quantitative evaluation indicators to obtain a plurality of accuracy indicators.

10. The method according to claim 5, wherein the method further comprises:
performing an accuracy assessment on the fused elevation data utilizing a checkpoint method within quantitative evaluation indicators to obtain a plurality of accuracy indicators.

11. The method according to claim 6, wherein the plurality of accuracy indicators comprises: a mean square error, a root-mean-square error, a mean absolute error, and a goodness of fit of the fused elevation data.

12. A multi-source elevation data fusion apparatus, wherein the apparatus is applied to an elevation data fusion device, and the apparatus comprises:
a prediction module, configured to input acquired optical elevation data into a trained optical elevation error prediction model to output an optical elevation error value and an optical elevation error weight map, and input acquired radar elevation data into a trained radar elevation error prediction model to output a radar elevation error value and a radar elevation error weight map;
a correction module, configured to correct the optical elevation data based on the optical elevation error value to obtain optical elevation data to be fused; correct the radar elevation data based on the radar elevation error value to obtain radar elevation data to be fused;
a fusion module, configured to perform weighted fusion on the optical elevation data to be fused and the radar elevation data to be fused based on the optical elevation error weight map and the radar elevation error weight map to obtain fused elevation data.

13. A computer device, comprising: a memory, a processor, and a computer program stored in the memory and executable on the processor, wherein the processor is configured to implement the steps of the method as claimed in claim 1 when executing the computer program.

14. A computer device, comprising: a memory, a processor, and a computer program stored in the memory and executable on the processor, wherein the processor is configured to implement the steps of the method as claimed in claim 2 when executing the computer program.

15. A computer device, comprising: a memory, a processor, and a computer program stored in the memory and executable on the processor, wherein the processor is configured to implement the steps of the method as claimed in claim 3 when executing the computer program.

16. A computer device, comprising: a memory, a processor, and a computer program stored in the memory and executable on the processor, wherein the processor is configured to implement the steps of the method as claimed in claim 4 when executing the computer program.

17. A non-transitory computer-readable storage medium, storing thereon a computer program, wherein when the computer program is executed by a processor, the steps of the method as claimed in claim 1 are implemented.

18. A non-transitory computer-readable storage medium, storing thereon a computer program, wherein when the computer program is executed by a processor, the steps of the method as claimed in claim 2 are implemented.

19. A non-transitory computer-readable storage medium, storing thereon a computer program, wherein when the computer program is executed by a processor, the steps of the method as claimed in claim 3 are implemented.

20. A non-transitory computer-readable storage medium, storing thereon a computer program, wherein when the computer program is executed by a processor, the steps of the method as claimed in claim 4 are implemented.

* * * * *